United States Patent Office 3,157,462
Patented Nov. 17, 1964

3,157,462
PROCESS FOR SEPARATING URANIUM AND VANADIUM VALUES
Angus V. Henrickson, Boulder, Colo., assignor to Kerr-McGee Oil Industries, Inc., a corporation of Delaware
No Drawing. Continuation of application Ser. No. 617,678, Oct. 23, 1956. This application Aug. 9, 1960, Ser. No. 48,342
17 Claims. (Cl. 23—14.5)

This invention relates to the recovery of metals from ores and more particularly to the recovery of vanadium from liquors or pulps by adsorption with strong base anion resin.

This application is a continuation of my copending application Serial No. 617,678, filed October 23, 1956, now abandoned.

In conventional hydrometallurgical practices, vanadium is frequently present as the alkali vanadate in caustic or soda ash solutions resulting from the direct leaching of vanadium bearing ores after roasting with salt or soda ash. The vanadium content of such solutions may be recovered by acidifying the solution to a pH of about 2.5 and then heating to precipitate vanadium oxide as red cake. In instances where the vanadium is associated with uranium, as in carnotite, carbonate leach liquor will also contain uranium dissolved as the uranyl tricarbonate complex. Where the vanadium content is relatively low, the uranium is ordinarily recovered by the addition of excess caustic soda to reduce the pH of the leach liquor to about 12, thereby precipitating the uranium content as alkali uranate. Where the vanadium content is relatively high, the uranium is ordinarily recovered by acidifying the carbonate leach solution to a pH of about 5 to destroy the tricarbonate complex, and then heating to expel carbon dioxide. Both the uranium and vanadium content will then be precipitated as artificial carnotite. This product is recovered, fused with soda ash, salt and sawdust and the fusion cake leached with water to dissolve the sodium vanadate content and leave behind high grade uranium oxide as an insoluble residue. The solution containing sodium vanadate is separated from insoluble uranium oxide, acidified to a pH of about 2.5, and then heated to precipitate vanadium oxide as red cake. In each of the above processes, it will be appreciated that vanadium is present in solution as sodium vanadate and that the solution is passed through a pH range of 7 to 10.5 prior to precipitation of vanadium oxide as red cake. Also, if the vanadium is to be recovered, the soda ash or carbonate solution is destroyed and not available for recycle. This unnecessarily increases costs by an appreciable amount since large quantities of mineral acid and either soda ash or alkali are required.

It is an object of the present invention to provide a novel and economic method of extracting vanadium from its solutions.

It is a further object of the present invention to provide a method of extracting pentavalent vanadium from solutions maintained at a pH between about 7.0 to 10.5 by adsorbing the vanadium content of such solutions with strong base anion exchange resin.

It is a further object of the present invention to provide a novel method of separating and extracting vanadium from solutions containing both vanadium and uranium values.

Still other objects and advantages of the present invention will be apparent to those skilled in the art by reference to the following detailed description and the examples.

It has been discovered that the vanadium content of a pentavalent vanadium solution maintained at a pH between about 7.0 to 10.5 is strongly adsorbed by strong base anion exchange resin. If the pH of the pentavalent vanadium solution is decreased to a pH less than about 7.0, or increased to a pH greater than about 10.5, there is a decrease in the ability or capacity of the strong base anion exchange resin to adsorb the vanadium content of the solution. Thus a pentavalent vanadium solution maintained at a pH between about 7.0 to 10.5 may be contacted with strong base anion exchange resin for such period of time as necessary for loading of the resin with vanadium, and then the vanadium bearing resin may be separated from the solution and stripped with either an acid solution having a pH less than about 7.0, or an alkaline solution having a pH greater than about 10.5, to thereby produce a regenerated resin suitable for recycle in the process and a concentrated solution of vanadium in the stripping solution.

By the term strong base anion exchange resin is intended water insoluble organic materials possessing strongly basic groups which are available to adsorb or react with certain desirable anions in such a manner as to hold the anions to such materials under the conditions taught herein, and then subsequently release the adsorbed anions in favor of still other anions which are more strongly adsorbed by the resin under certain other conditions taught herein either by virtue of their nature or their concentration. Such resins are generally available as porous granules of water insoluble polymeric material containing strongly basic groups, such as aliphatic or aromatic quaternary ammonium groups, which are attached to the polymers so as to be essentially immovable but available for reaction with desired anions. In general, the quaternary ammonium groups are thought to be attached to the polymer at certain regularly occuring intervals. Such materials may be referred to as polyquaternary ammonium resins.

One suitable method for making polyquaternary ammonium resins comprises chloromethylating an aromatic polymer, such as polystyrene, and then condensing the chloromethylated product with a tertiary amine. The resulting product is a material referred to herein as a strong base anion exchange resin. Typical polymers include polystyrene and polymers made by condensing formaldehyde and other aldehydes with aromatic hydroxy or amino compounds in general, or more specifically, with urea, melamine, or other cyanamide derivatives.

Inasmuch as strong base anion exchange resins are well known, a more specific or detailed discussion is not considered necessary for an understanding of the present invention. However, it may be mentioned that where the ion exchange resin contains both quaternary ammonium groups and tertiary amine groups, it is referred to herein as an intermediate base anion exchange resin unless the concentration of quaternary ammonium groups is sufficient to render the resin, in reality, a strong base anion exchange resin for the purposes of the invention. Intermediate base anion exchange resins are not generally suitable for the purposes of the present invention.

In instances where the pentavalent vanadium bearing solution is essentially free of uranium, as for example a basic carbonate leach of roasted vanadinite $$(PbCl)Pb_4(VO_4)_3$$

or roscoelite $K_2V_4Al_2Si_6O_{20}(OH)_4$, the vanadium may be recovered by simply adjusting the pH of the solution to a range between about 7.0 to 10.5 and then contacting the vanadium bearing solution with strong base anion exchange resin. The pH of pentavalent vanadium bearing solution desscribed herein may be increased by addition of a suitable base such as sodium hydroxide, potassium hydroxide, etc.; or decreased by addition of sulfuric acid, or other suitable mineral acid, or by contacting the solution with a carbon dioxide containing gas, such as flue gas.

In instances where the pentavalent vanadium bearing solution contains uranium values as well as vanadium, the uranium is removed prior to extraction of the vanadium by any of the conventional hydrometallurgical methods. For example, one suitable method for the removal of uranium from vanadium bearing solution is by precipitation of the uranium as alkali uranate. By this method, sufficient caustic is added to the solution to provide an excess of from 5 to 10 grams per liter. The uranium values are thereby precipitated as alkali uranate and may be separated from the vanadium bearing solution by filtration. The vanadium content of the solution is then recovered with strong base anion exchange resin in accordance with the present invention. Uranium values present in vanadium bearing carbonate solution may also be removed by precipitation as artificial carnotite provided the vanadium is present in an amount stoichiometrically equal to or greater than the uranium. By this method, the normally alkaline solution containing uranium and vanadium is acidified by addition of mineral acid to a pH of about 5, and then boiled to expel carbon dioxide. The entire uranium content and a stoichiometric quantity of vanadium is thereby precipitated as artificial carnotite, leaving any vanadium in excess of the stoichiometric quantity in solution. The precipitated artificial carnotite is separated from the solution and subsequently fused with salt, soda ash and sawdust, and the fusion cake leached with the water. The vanadium is dissolved in the leach water leaving uranium behind as a high grade uranium oxide residue. The resultant vanadium bearing leach solution is then combined with the original vanadium bearing solution, the pH adjusted within the range of about 7.0 to 10.5 and contacted with strong base anion exchange resin in accordance with the present invention.

Still another method of removing the uranium content of a solution containing vanadium values and uranium as the uranyl tricarbonate complex is by adjusting the pH of the solution to a pH value greater than 10.5, or preferably to a pH between 11.0 and the point of incipient precipitation of sodium uranate, which occurs at a pH of about 11.3. The uranium may then be recovered from the solution by adsorption with strong base anion exchange resin leaving the vanadium in solution.

In accordance with the present invention, a solution containing pentavalent vanadium which is either naturally free of uranium, or which has been freed of uranium by one of the foregoing methods or other suitable method, is contacted with strong base anion exchange resin at a pH between about 7.0 to 10.5. Preferably, the pH of the solution should be adjusted to a pH between about 9 to 10 since this pH range is more favorable for the adsorption of vanadium by strong base anion exchange resin. The apparatus used in contacting the vanadium bearing solution with the resin may be any conventional equipment now in use for contacting similar solutions with ion exchange materials, and the specific construction or design of such apparatus does not form a part of this invention. However, suitable apparatus for use in connection with the present invention includes conventional columns where the resin is held in a suitable container and the solution is passed through the column and thus through the contained bed of resin. Other devices, such as countercurrent extraction systems or crosscurrent extraction systems embodying a movement of resin in relation to the stream of solution, are equally applicable for use in connection with the present invention.

The strong base anion exchange resin is contacted with a sufficient volume of vanadium bearing solution and for a sufficient period of time as to cause the resin to become loaded with vanadium. At this time, the capacity of the resin for adsorption of vanadium is nil and it is necessary to regenerate the vanadium loaded resin before recycling. The resin may be regenerated and the vanadium recovered therefrom by removing the resin from vanadium bearing solution, and then eluting the same with either an acidic solution having a pH less than 7.0 or a caustic solution having a pH greater than 10.5. The preferred pH range for the eluent on the acid side is a pH of no greater than 1.5 while the preferred pH on the alkaline side is a pH at least as great as 11.0. The regenerated resin may be recycled in the process of the present invention, while the vanadium content of the eluent may be recovered by any suitable process well known to the art, such as by acidifying the solution to a pH of about 2.5 or lower and boiling to precipitate the vanadium content as red cake.

In the leaching of certain ores with soda ash, the resultant pulp is excessively slimy and the separation of solids from the liquor constitutes a major problem. This problem may be overcome by use of strong base anion exchange resin which is contained in baskets suspended directly in the pulp. Thus the vanadium content of the solution may be recovered directly from the pulp and without first separating the solids therefrom.

The foregoing detailed description of the present invention and the following examples are given for the purpose of illustration only, and are not intended as being limiting to the spirit or scope of the appended claims.

*Example 1*

Five vanadium solutions containing 0.2 gram per liter of $V_2O_5$ were prepared. The pH values of the five solutions were adjusted to 7.9, 9.0, 9.9, 10.9 and 12.0, respectively. One gram of strong base anion exchange resin was then added to each of the five solutions, the quantity of solution used in each instance being great enough to insure the presence of an amount of vanadium greatly in excess of the theoretical capacity of the resin.

The specific strong base anion exchange resin used in this and the following examples, unless otherwise noted, may be identified as di-vinyl benzene cross-linked polystyrene containing quaternary ammonium groups. This resin is available commercially as a proprietary product of Rohm and Haas Company and is identified by this company as IRA-400. It will be appreciated by those skilled in the art that similar strong base anion exchange resins may be substituted therefor.

The resin was stirred with the solutions for about eight hours at room temperature to allow the resin and solutions to come to equilibrium. The resin was then separated from the solutions and a sample of resin from each of the five solutions analyzed by usual procedure to determine the amount of vanadium which had been adsorbed. The results are tabulated below:

| Solution No. | pH | Vanadium adsorbed in milligrams of $V_2O_5$ per gram of resin |
|---|---|---|
| 1 | 7.9 | 6 |
| 2 | 9.2 | 11 |
| 3 | 9.9 | 17 |
| 4 | 10.9 | 2 |
| 5 | 12.0 | 0 |

The above tabulated data indicate the more favorable pH range for the adsorption of vanadium from carbonate solutions as well as the more favorable pH range for eluting solutions used in regenerating and recovering vanadium values from the vanadium loaded resin. The most favorable pH for the adsorption of vanadium is indicated by the above data as being about 9.9. However, a pH range of about 9.0 to 10.0 is very satisfactory and thus preferred in most instances. It may also be noted that the capacity of the resin to adsorb vanadium from solution falls off rapidly with increasing pH at a pH above about 10.5 and at a pH above about 10.9 the resin capacity is negligible. At pH values above 12.0, the capacity of the resin is nil and thus a solution having a pH value of 12.0 or above may be preferred in many instances to recover the vanadium from the loaded resin.

*Example II*

Favorable adsorption of vanadium at pH values ranging between 9.0 to 10.0 was found to hold true at higher concentrations of vanadium than 0.2 gram per liter.

Five vanadium solutions containing 6.0 grams per liter of $V_2O_5$ were prepared. The pH values of the five solutions were then adjusted to 8.0, 8.7, 9.6, 10.6 and 12.0, respectively. One gram of strong base anion exchange resin identical with that of Example I was then added to each of the solutions and stirred for eight hours at room temperature, the quantity of solution used in each instance being sufficient to provide a quantity of vanadium greatly in excess of the theoretical capacity of the resin. The resin was then separated from the various solutions and the absorbed vanadium content of each of the five portions of resin determined by analysis. The results are tabulated below:

| Solution No. | pH | Vanadium adsorbed in milligrams of $V_2O_5$ per gram of resin |
|---|---|---|
| 1 | 8.0 | 180 |
| 2 | 8.7 | 216 |
| 3 | 9.6 | 256 |
| 4 | 10.6 | 180 |
| 5 | 12.0 | 0 |

*Example III*

One kilogram of vanadium-bearing ore was digested with 5% soda ash solution. The resultant pulp was filtered through an 80 mesh screen and the pH then adjusted to 9.5 by bubbling carbon dioxide gas through the pulp. The screened pulp having a pH of 9.5 was stirred with 50 grams of strong base anion exchange resin identical with that of Example I, the resin having a grain size greater than 80 mesh so that separation by screening from the pulp would be possible. The pulp and resin were allowed to remain together with stirring for a period of about one-half hour and then the resin was separated from the pulp by passing the mixture over 80 mesh screen.

The amount of vanadium adsorbed by the resin and the amount of dissolved vanadium remaining in the pulp was determined by analysis of the resin and analysis of the pulp liquor. No vanadium could be detected in the pulp liquor by the usual quantitative methods while the resin contained a total of 2.5 grams $V_2O_5$. This represents a loading of 50 mg. of $V_2O_5$ per gram of resin or 5 percent $V_2O_5$.

*Example IV*

A 5% soda ash leach solution was obtained by leaching uranium and vanadium bearing ore in a carbonate leach circuit, in the presence of bicarbonate, at a pH varying between about 7 to 10. This solution containing 1 gram per liter of $V_2O_5$ and 2 grams per liter of $U_3O_8$ was adjusted to a pH of 11.4 and passed through an ion exchange column packed with strong base anion exchange resin identical with that of Example I. The vanadium broke through at one column volume indicating that the adsorption of vanadium at this pH is negligible, whereas the uranium continued to be adsorbed completely until 10 column volumes had passed through the ion exchange column.

The ion exchange column was then washed with water and the resin eluted with 10% ammonium sulfate solution followed by elution with dilute sulfuric acid. The resin was regenerated by this treatment while the eluent contained the uranium content of the loaded resin. The eluent was analyzed for vanadium by usual procedure with negative results.

The pH of the uranium barren soda ash leach solution obtained from the foregoing procedure and thus still containing the vanadium was adjusted to 9.5 by bubbling carbon dioxide through the solution. This solution, having a pH of 9.5, was then passed through an ion exchange column identical with that used in the foregoing procedure, but containing regenerated strong base anion exchange resin. Adsorption of the vanadium by the resin was found to be complete.

The vanadium was then stripped from the strong base anion exchange resin by elution of the resin with sodium hydroxide solution having a pH of 11.5. The eluent was found to contain a ten-fold concentration of vanadium.

It is apparent from the foregoing that the process of the present invention provides a unique method for complete separation of uranium and/or vanadium from a solution containing each of these substances. The uranium may be completely separated from the vanadium and obtained as a substantially pure concentrated solution of uranium. Similarly, the vanadium may be completely separated from uranium and obtained as a substantially pure concentrated solution of vanadium.

It was found that the soda ash leach solution from which the uranium and vanadium were removed had a pH of approximately 9.5 and thus was in condition for recycle to the carbonate leach circuit.

*Example V*

One hundred ml. portions of soda ash solutions containing vanadium as the pentavalent vanadate and having a pH of 9.5 were stirred with 1 gram portions of various strong base anion exchange resins and intermediate base anion exchange resins for a period of eight hours at room temperature. After agitation for this period of time, the resins were separated and each resin quantitatively analyzed for vanadium adsorption. The results are tabulated below:

| Run No. | Type of Anion Exchange Resin | Trade Name and Manufacturer of Resin | Adsorption, mg. $V_2O_5$ per gram of Resin |
|---|---|---|---|
| 1 | Strong base anion exchange resin. | Amberlite IRA 400, Rohm and Haas Co. | 164 |
| 2 | ...do... | Permutit SK, The Permutit Co. | 160 |
| 3 | ...do... | Permutit S2, The Permutit Co. | 121 |
| 4 | Intermediate base anion exchange resin. | Permutit A, The Permutit Co. | 27 |
| 5 | Strong base anion exchange resin. | Duolite ES 102, Chemical Process Co. | 177 |
| 6 | Intermediate base anion exchange resin. | Duolite A30 Chemical Process Co. | 17 |

What is claimed is:

1. A process for separating uranium and vanadium values present in solution as uranyl tricarbonate complex and pentavalent vanadium comprising contacting the solution with water insoluble anion exchange resin containing at least some quaternary ammonium groups to adsorb the uranyl tricarbonate complex, the quantity of resin contacted with the solution being sufficient to adsorb the uranyl tricarbonate complex content and the solution having a pH greater than 10.5 and less than the pH at which the uranium values are precipitated, separating the resin and the uranyl tricarbonate complex absorbed thereby from the solution, and thereafter extracting vanadium values from the solution.

2. The process of claim 1 wherein the pH of the solution containing uranyl tricarbonate complex and pentavalent vanadium is at least 11.0.

3. A process for recovering vanadium values substantially free of uranium from a solution containing uranyl tricarbonate complex and pentavalent vanadium comprising contacting the solution at a pH greater than 10.5 and less than the pH at which uranium is precipitated with a first portion of water insoluble strong base anion exchange resin, the quantity of the first portion of resin being sufficient to adsorb the uranium tricarbonate complex content of the solution, separating the first portion of resin and the uranium tricarbonate complex content adsorbed thereby from the solution, adjusting the pH of the resulting uranium-barren solution to a value between about 7.0 to 10.5, contacting the solution with a second portion of water insoluble strong base anion exchange resin, at least a portion of the vanadium content of the solution being adsorbed by the second portion of resin, separating the second portion of resin and vanadium values adsorbed thereby from the solution, and then recovering vanadium values substantially free of uranium from the second portion of resin.

4. The process of claim 3 wherein the vanadium values are recovered from the resin by eluting the resin with an alkaline solution having a pH greater than about 10.5.

5. The process of claim 3 wherein the vanadium values are recovered from the resin by eluting the resin with an alkaline solution having a pH of at least about 12.0.

6. The process of claim 3 wherein the vanadium is recovered from the resin by eluting the resin with an acidic solution having a pH less than about 7.0.

7. The process of claim 3 wherein the vanadium is recovered from the resin by eluting the resin with an acidic solution having a pH not greater than about 1.5.

8. The process of claim 3 wherein the pH of the uranium-barren solution is adjusted to a pH between about 9.0 to 10.

9. The process of claim 3 wherein the pH of the solution containing uranyl tricarbonate complex and pentavalent vanadium is at least 11.0.

10. A process for recovering vanadium values substantially free of uranium from a solution containing uranyl tricarbonate complex and pentavalent vanadium comprising contacting the solution at a pH greater than 10.5 and less than the pH at which uranium is precipitated with a first portion of water insoluble anion exchange resin containing at least some quaternary ammonium groups, the quantity of the first portion of resin being sufficient to adsorb the uranium tricarbonate complex content of the solution, separating the first portion of resin and the uranium tricarbonate complex content adsorbed thereby from the solution, adjusting the pH of the resulting uranium-barren solution to a value between about 7.0 and 10.5, contacting the uranium-barren solution with a second portion of water insoluble anion exchange resin containing at least some quaternary ammonium groups, at least a portion of the vanadium content of the solution being adsorbed by the second portion of resin, separating the second portion of resin and the vanadium values adsorbed thereby from the solution, and then recovering vanadium values substantially free of uranium from the second portion of resin.

11. The process of claim 10 wherein the vanadium values are recovered from the resin by eluting the resin with an alkaline solution having a pH greater than 10.5.

12. The process of claim 10 wherein the pH of the solution containing uranyl tricarbonate complex and pentavalent vanadium is at least 11.0.

13. The process of claim 10 wherein the vanadium values are recovered from the resin by eluting the resin with an alkaline solution having a pH of at least about 12.0.

14. The process of claim 10 wherein the pH of the uranium-barren solution is adjusted to a pH between about 9.0 and 10.0.

15. The process of claim 14 wherein the solution containing uranyl tricarbonate complex and pentavalent vanadium has a pH of at least 11.0.

16. A process for separating uranium values from vanadium values present in aqueous solution as uranyl tricarbonate complex and pentavalent vanadium comprising contacting the solution with water insoluble strong base anion exchange resin to adsorb uranyl tricarbonate complex, the solution having a pH greater than about 10.5 and less than the pH at which the uranium values are precipitated, separating the resin and the uranyl tricarbonate complex adsorbed thereby from the solution, and thereafter extracting vanadium values from the solution.

17. The process of claim 16 wherein the pH of the solution containing uranyl tricarbonate complex and pentavalent vanadium is at least 11.0.

References Cited in the file of this patent

UNITED STATES PATENTS

| 2,780,514 | Lutz | Feb. 5, 1957 |
| 2,864,667 | Bailes et al. | Dec. 16, 1958 |

FOREIGN PATENTS

| 626,882 | Great Britain | July 22, 1949 |

OTHER REFERENCES

Abrams: AEC Document; ACCO-8, pp. 1-20, Oct. 30, 1951.

Brown: AEC Document; ACCO-36, pp. 17, 18, Oct. 15, 1953.

Kaufman: AEC Document; ACCO-68, pp. 5-9, 28-31 (1954).

Stephens et al.: "Proceeding of the International Conference on the Peaceful Uses of Atomic Energy," Aug. 8-20, 1955, vol. 8, p. 20, United Nations.